Dec. 16, 1969   J. W. CUNNINGHAM   3,484,575
PULSED WELDING AND CUTTING BY VARIATION OF
COMPOSITION OF SHIELDING GAS
Filed April 24, 1967
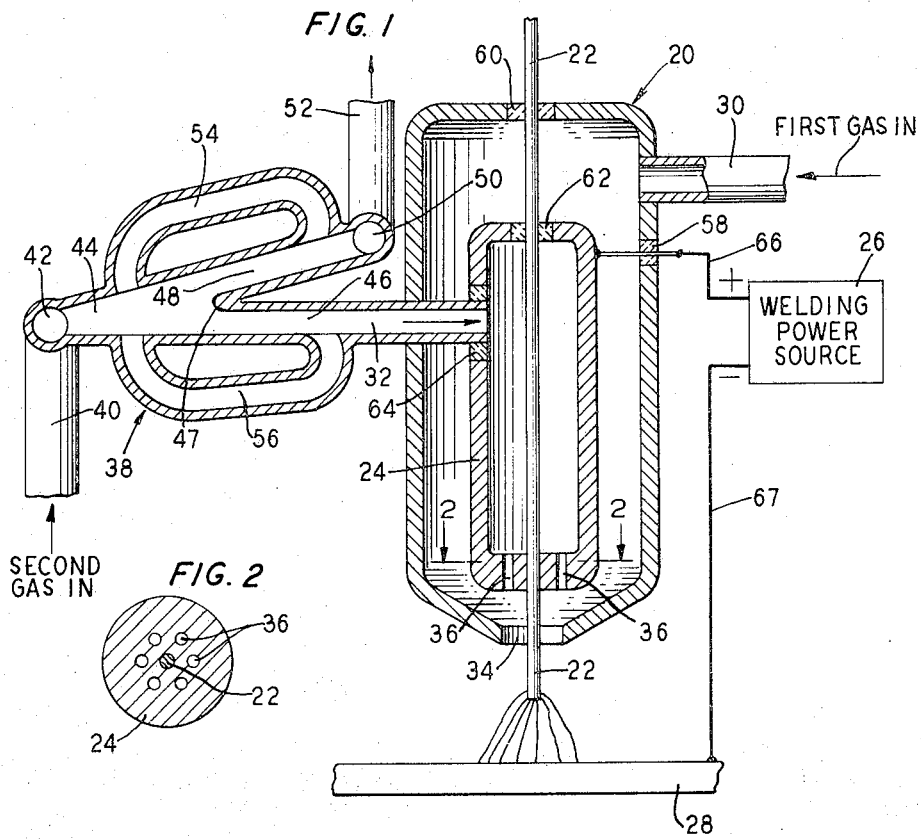
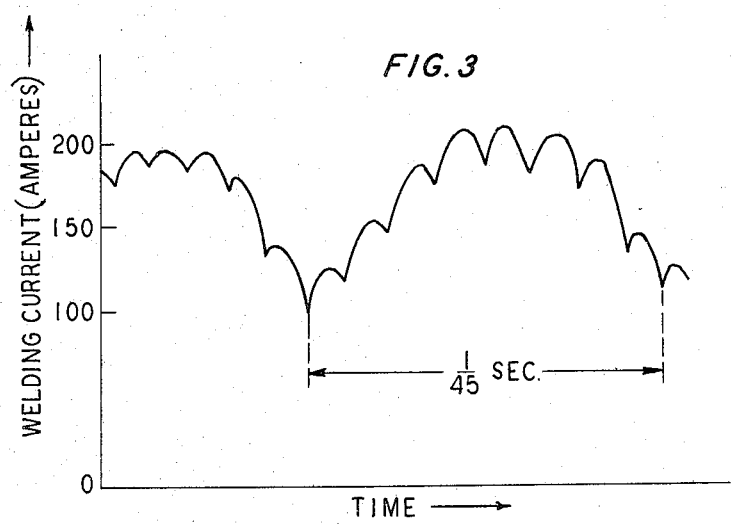
INVENTOR
JOHN W. CUNNINGHAM
BY
Larry R. Cassett
ATTORNEY United States Patent Office 3,484,575
Patented Dec. 16, 1969

3,484,575
PULSED WELDING AND CUTTING BY VARIATION OF COMPOSITION OF SHIELDING GAS
John W. Cunningham, Summit, N.J., assignor to Air Reduction Company, Incorporated, New York, N.Y., a corporation of New York
Filed Apr. 24, 1967, Ser. No. 633,277
Int. Cl. B23k 9/16, 9/00, 35/38
U.S. Cl. 219—74                6 Claims

ABSTRACT OF THE DISCLOSURE

A method and apparatus for pulsing the arc current in a gas shielded arc welding or cutting operation by supplying two different shielding gases to the arc concurrently and periodically varying the flow of at least one of the gases, each of said gases when used alone resulting in a different value of arc voltage and/or current parameters.

FIELD OF THE INVENTION

The invention relates to control means and methods operating in conjunction with a non-pulsed power source and an electric welding or cutting arc to provide the advantages of pulsed power operation without the necessity of providing a specialized source of pulsed power, and more particularly to obtaining a pulsing effect in the welding or cutting current by periodic variation of the composition of the shielding gas.

DESCRIPTION OF THE PRIOR ART

Pulsed power welding, with particular reference to the spray transfer welding mode, is disclosed and claimed in U.S. Patent No. 3,071,680, issued Jan. 1, 1963 to N. E. Anderson and W. J. Greene, and owned by the assignee herein. This welding method has received wide acceptance in the welding industry in spite of the fact that it requires a somewhat complex power supply. The power supply is adapted for delivering to the arc periodic pulses of high current conducive to the spray mode of metal transfer, while a steady value of arc current between pulses causes no transfer of metal. In this way, the benefits of the spray transfer mode of metal transfer are obtained while the average value of the welding current is substantially less than is the case when the arc is maintained continuously at a sufficiently high value of welding current to obtain uninterrupted metal transfer in the spray mode. The reduction of the average welding current is advantageous in that the fluidity of the weld pool is reduced, which facilitates out-of-position welding, such as overhead welding, and also in that the resulting lower temperature of the weld pool tends to prevent overheating, melting and burning through of thin workpieces.

SUMMARY OF THE INVENTION

The invention causes pulsations in the current through a welding or cutting arc by means of periodic variations in the composition of the shielding gas in which the arc operates.

For the purposes of the present invention, the concept of pulsed welding will be enlarged to include any method of welding in which it is desired to cause the welding current to vary between one current value and another for any purpose. Thus, the invention is not to be construed as being limited to alternating between intervals of spray mode metal transfer and intervals of no metal transfer, but may be employed to pulsate between any two predetermined values of welding current.

The benefits of the invention are not limited to fusible metal inert gas welding, that is, welding with a consumable electrode. The invention is also applicable to tungsten inert gas welding, either with or without the addition of filler metal, wherein desired penetration is obtainable with a lower average welding current than is possible without using the invention.

In addition to the advantages mentioned above as flowing from a reduction of the average welding current while obtaining the benefit of higher peak current, the invention also promotes more pronounced puddle agitation and improved penetration or more uniform penetration of the weld into the workpiece, particularly in tungsten inert gas welding. The invention is also applicable to plasma welding and plasma cutting.

BRIEF DESCRIPTION OF THE DRAWINGS

FIG. 1 is an elevational view, partly in section and partly schematic, showing a preferred embodiment of the invention;

FIG. 2 is a cross-sectional view of a contact tube appearing in FIG. 1, the section being taken along line 2—2 in FIG. 1; and FIG. 3 is a graph of the variation of welding current with time, illustrative of the operation of the embodiment of the invention shown in FIGS. 1 and 2.

DESCRIPTION OF THE PREFERRED EMBODIMENT

Referring to FIGS. 1 and 2, there are shown a welding head 20, a consumable welding electrode 22, a contact tube 24, a welding power source 26, having a positive terminal connected to the contact tube 24 through a conductor 66 and a negative terminal connected to a workpiece 28, through a conductor 67 to constitute a reverse polarity power connection. However, if desired, the opposite polarity or an alternating current power supply may be substituted for the reverse polarity power connection illustrated.

A first shielding gas, such as argon, is supplied to the hollow interior of the welding head 20 through a conduit 30, and a second shielding gas, such as carbon dioxide, $CO_2$, is supplied intermittently to the interior of the contact tube 24 through a conduit 32 or to the hollow interior of the welding head 20. Between applications of the second shielding gas, the first shielding gas issues from the welding head 20 through an orifice 34 to surround the electrode 22, to form the conductive medium in which the arc is maintained, and to protect the weld pool and the workpiece from deleterious effects of whatever ambient atmosphere is present when a shielding gas is not provided.

For a given value of arc voltage, the value of the arc current depends upon the electrical conductivity of the gas in which the arc is maintained. The electrical conductivity of a given gas or gas mixture depends upon the degree of ionization which is produced in the gas or gases. The ionization may be produced by radiation or by high temperature.

The second shielding gas, when applied, issues through holes 36 in the lower end of the contact tube 24, more or less pushing aside the stream of the first shielding gas and passing through the orifice 34 to more or less completely displace the first shielding gas as the conductive medium in which the arc is maintained and as the protective agent against the ambient atmosphere. The holes 36 have a length considerably greater than their diameter and are straight, in order to promote laminar flow of the second shielding gas through the orifice 34 and into the arc region.

The second gas may also issue from the same ports as the first gas alternating between the first gas and the second gas.

Argon, although it has a higher ionization potential than carbon dioxide, actually ionizes more readily than does carbon dioxide under conditions usually found in the electric arc. As a result the electrical conductivity of the electric arc in argon is greater than that in carbon dioxide. Accordingly, for a given value of arc voltage, the arc current is greater in argon than in carbon dioxide.

Intermittent flow of the second shielding gas through the conduit 32 is secured by any suitable means, which is here illustrated as a fluidic oscillator or fluidic bistable device 38. The second shielding gas is introduced into the device 38 through a conduit 40 which feeds through an inlet 42 into a branching tube 44, the latter having a branch 46 continuous with the conduit 32, and a branch 48 which feeds through an outlet 50 into a conduit 52, the branches originating at a branch point 47.

A stream of gas in the forked tube 44 is made to flow into one of the branch tubes 46 or 48 to the substantial exclusion of the other branch tube, by means of a stream of gas introduced into the forked tube 44 from a side tube. One side tube 54 is arranged to admit at times a stream of gas which serves to deflect the main gas stream into the branch tube 46, whereas another side tube 56 is arranged to admit at other times a stream of gas oppositely directed from the stream from side tube 54 which serves to deflect the main stream into the branch tube 48.

When the main gas stream is in the branch tube 46, a portion of the stream is fed back through the side tube 56, one end of which opens out from the branch tube 46 downstream from the branch point 47. The gas stream thus fed back deflects the main stream into the branch tube 48. Then, when the main stream is in the branch tube 48, a portion of the stream is fed back through the side tube 54, one end of which opens out from the branch tube 48 downstream from the branch point 47. The gas stream thus fed back deflects the main stream back into the branch tube 46. The process repeats periodically as long as gas is supplied to the forked tube 44, causing a pulsating flow of gas through the conduit 32 into the interior of the contact tube 24, and through the holes 36 and the orifice 34 to the arc region.

A steady flow of gas is supplied through the conduit 30. This gas passes into the interior of the welding head 20 and flows out through the orifice 34. During pulses of flow of the second gas through the holes 36, the first gas tends to be displaced outwardly by the second gas, with the result that the arc operates alternately in a medium composed principally of the first gas and in a medium composed principally of the second gas.

Other ways of varying the composition of the shielding gas supplied to the arc, in a periodic manner, will be evident to one skilled in the art. For example, each of the gases may be shut off while the other gas is being supplied to the arc, or two ingredients of a mixed gas may be varied alternately while the mixture is supplied to the arc through a single conduit or passage.

The frequency of the oscillations in the embodiment illustrated is determined by such factors as the inside diameters of the side tubes 54, 56 and the length of branch tube and of side tube introduced into the feedback circuit.

The diverted stream of gas in branch tube 48 may be utilized for other purposes, or it may be returned to storage through suitable conduits and non-return valves for re-introduction into conduit 40, or alternatively the stream in the conduit 52 may be led through a suitable length of delay conduit and combined in phase coincidence with the stream in the conduit 32.

To maintain electrical insulation of the welding current circuit from the electrically conductive portions of the gas flow passages, insulating bushings 58, 60, 62 and 64 are provided. The negative conductor 66 is passed through the bushing 58. The electrode 22 is passed through the bushing 60 in the welding head 20 and through the bushing 62 in the upper portion of the contact tube 24 to make electrical contact with the lower portion of the contact tube. The conduit 32 is shown as making electrical contact with the welding head 20 in entering the welding head, but it is insulated from the contact tube 24 by the bushing 64 in entering the interior of the contact tube.

A plurality of holes 36 are preferably provided to promote the designed laminar flow of gas, six holes being illustrated in FIG. 2, symmetrically disposed about the electrode 22.

FIG. 3 shows the variation of welding current as a function of time, for good spray transfer welding, in an illustrative case observed in the successful application of the invention. The welding power source used was a three-phase rectifier supplying a substantially constant voltage of 32 volts aross the arc irrespective of the arc current. A consumable wire electrode of mild steel, diameter 0.045 inch, was fed to the arc at such speed as to maintain a distance of approximately ⅞ inch from the tip of the contact tube 24 to the surface of the workpiece. The shielding gas in conduit 30 was argon flowing at approximately 50 cubic feet per hour. The pulsed gas was carbon dioxide, pulsing at approximately 45 cycles per second. The peak value of the pulsed welding current was approximately 200 amperes, with a background current of approximately 120 amperes. The average welding current value thus obtained was approximately 160 amperes. It had previously been established that without pulsing, the transition point for spray type metal transfer in argon for the wire used was approximately 200 amperes. Thus, the pulsing of the second gas resulted in a reduction of at least 40 amperes in the average welding current required to maintain good spray transfer. A 360 cycle per second ripple, due to the rectified three-phase 60 cycle per second power supply is observable superimposed upon the current wave shown in FIG. 3.

By adjusting the flow of the respective gases, the shape of the curve illustrated in FIG. 3 may be varied. For example, whereas the curve in FIG. 3 shows relatively long dwell at the maximum current value and relatively short dwell at the minimum current value, it may be desirable to substantially equalize the dwell times at the two current values.

It is believed that the observed variation of arc current with change in shielding gas composition may be explained as follows. It will be assumed that power is supplied to the arc from a constant voltage source such as a battery and that the electrode wire is fed to the arc at a certain constant speed. Under these conditions, the arc will adjust to a length which is just sufficient to draw the amount of arc current needed to consume the wire at the speed at which it is fed to the arc. The arc length will depend upon the particular gaseous atmosphere in which the arc operates. To begin with, the arc will be assumed to be operating in argon. Now, if carbon dioxide is suddenly thrown into the arc, the conductance of the arc is decreased so that the arc current suddenly becomes smaller. The effect is the same as if the arc had suddenly been lengthened while the composition of the gas remained unchanged. Because the current is less and the wire continues to feed at the same speed, the arc length quickly shortens until the current rises to the original value necessary to melt the wire as fast as it is fed to the arc. Before the curren can become fully readjusted, argon is substituted for the carbon dioxide. This change increases the conductance of the arc, increasing the arc current. The effect is the same as if the arc had suddenly been shortened while the composition of the gas remained unchanged. The wire now melts faster and the arc quickly lengthens until the current is reduced to the original value necessary to melt the wire as fast as it is fed to the arc. The changes in gas composition are made to follow each other sufficiently fast so that the arc current cannot reach equilibrium but keeps pulsating between the higher and lower transient values occasioned by the changes in composition of the gas.

Other substantially inert shielding gases or gas mixtures may be used instead of argon, an example being a mixture of argon with 2 percent of oxygen added. Also, other gases or gas mixtures may be substituted for the pulsed carbon dioxide, an example being helium.

The pulsing frequency need not be restricted to 45 cycles per second, but may be either more or less than 45 cycles per second, according to circumstances. For tungsten inert gas welding, a pulsing frequency on the order of 10 cycles per second has been found beneficial. For fusible metal inert gas welding, in some cases, pulsing frequencies of 60 cycles per second or higher may be beneficial.

While illustrative forms of apparatus and methods in accordance with the invention have been described and shown herein, it will be understood that numerous changes may be made without departing from the general principles of the invention.

What is claimed is:

1. The method of pulsing the arc current in an electric welding or cutting arc, comprising the steps of supplying shielding gas to the arc, and periodically varying the composition of the shielding gas, while continuously maintaining the arc in operation, thereby to concurrently vary the arc current.

2. Apparatus for pulsing the arc current in an electric welding or cutting arc, comprising, in combination, two shielding gas supply means connected to the arc, each for supplying to the arc a gas of a different composition, and means to periodically vary the flow of at least one said gas, thereby to periodically vary the composition of the gas present in the arc, and consequently to vary the arc current.

3. Apparatus according to claim 2, in which the said two gas supply means are arranged to supply gas through paths generally concentric with respect to the axis of the arc electrode, whereby gas from the inner supply means is enabled to variably displace gas from the outer supply means.

4. Apparatus according to claim 2, in which the said means to vary the flow of at least one said gas comprises a fluidic bistable device.

5. Apparatus according to claim 2, in which the said means to vary the flow of at least one said gas comprises a fluidic oscillator.

6. The method of melting metal with an electric arc comprising the steps of supplying to the space enveloping the electric arc an atmosphere having one resistance to the passage of arc current and periodically varying the composition of said atmosphere so as to alter its resistance to the flow of current thereby periodically varying the arc current.

References Cited

UNITED STATES PATENTS

| 2,819,383 | 1/1958 | Johnston | 219—74 X |
| 2,871,336 | 1/1959 | Lobosco et al. | 219—74 |
| 3,324,278 | 6/1967 | Jackson | 219—74 X |

FOREIGN PATENTS 770,351   3/1957   Great Britain.

JOSEPH V. TRUHE, Primary Examiner
C. L. ALBRITTON, Assistant Examiner

U.S. Cl. X.R.
219—121, 130